US008566770B2

(12) United States Patent
Lilja (10) Patent No.: US 8,566,770 B2
(45) Date of Patent: Oct. 22, 2013

(54) LAYOUT METHOD FOR SOFT-ERROR HARD ELECTRONICS, AND RADIATION HARDENED LOGIC CELL

(76) Inventor: Klas Olof Lilja, Pleasanton, CA (US)

( * ) Notice: Subject to any disclaimer, the term of this patent is extended or adjusted under 35 U.S.C. 154(b) by 0 days.

(21) Appl. No.: 13/277,135

(22) Filed: Oct. 19, 2011

(65) Prior Publication Data

US 2012/0185816 A1    Jul. 19, 2012

Related U.S. Application Data

(62) Division of application No. 12/354,655, filed on Jan. 15, 2009, now abandoned.

(60) Provisional application No. 61/011,559, filed on Jan. 17, 2008, provisional application No. 61/011,989, filed on Jan. 22, 2008, provisional application No. 61/068,483, filed on Mar. 7, 2008, provisional application No. 61/123,003, filed on Apr. 5, 2008.

(51) Int. Cl.
*G06F 17/50* (2006.01)
*H03K 19/003* (2006.01)
*H03K 19/007* (2006.01)

(52) U.S. Cl.
USPC ........... 716/119; 716/106; 716/111; 716/120; 716/132; 716/136; 716/139; 716/55; 326/9; 326/12; 326/14

(58) Field of Classification Search
USPC ......... 716/106, 111, 119, 120, 132, 136, 139, 716/55; 326/9, 12, 14
See application file for complete search history.

(56) References Cited

U.S. PATENT DOCUMENTS

| 6,127,864 | A | 10/2000 | Mavis et al. |
| 6,278,287 | B1 | 8/2001 | Baze |
| 6,433,983 | B1 | 8/2002 | Fechner |
| 6,703,858 | B2 * | 3/2004 | Knowles ........................ 326/9 |
| 6,807,081 | B2 | 10/2004 | Nii |
| 7,023,235 | B2 | 4/2006 | Hoff |
| 7,075,337 | B2 | 7/2006 | Wood et al. |
| 7,139,190 | B1 | 11/2006 | de Jong |

(Continued)

FOREIGN PATENT DOCUMENTS

JP    2002-373899 A    12/2002

OTHER PUBLICATIONS

Calin et al.; "Upset Hardened Memory Design for Submicron CMOS Technology"; IEEE Transactions on Nuclear Science; vol. 43, No. 6, Dec. 1996, pp. 2874-2878.

(Continued)

*Primary Examiner* — Helen Rossoshek
(74) *Attorney, Agent, or Firm* — K&L Gates LLP (57) ABSTRACT

This invention comprises a layout method to effectively protect logic circuits against soft errors (non-destructive errors) and circuit cells, with layout, which are protected against soft errors. In particular, the method protects against cases where multiple nodes in circuit are affected by a single event. These events lead to multiple errors in the circuit, and while several methods exist to deal with single node errors, multiple node errors are very hard to deal with using any currently existing protection methods. The method is particularly useful for CMOS based logic circuits in modern technologies (.ltoreq.90 nm), where the occurrence of multiple node pulses becomes high (due to the high integration level). It uses a unique layout configuration, which makes the circuits protected against single event generated soft-errors.

20 Claims, 9 Drawing Sheets

(56) References Cited

U.S. PATENT DOCUMENTS

| | | | |
|---|---|---|---|
| 7,215,135 B2* | 5/2007 | Carlson | 326/14 |
| 7,236,001 B2* | 6/2007 | Fulkerson | 326/12 |
| 7,289,375 B2 | 10/2007 | Fukui | |
| 7,298,010 B1* | 11/2007 | Ma | 257/359 |
| 7,310,759 B1 | 12/2007 | Carmichael et al. | |
| 7,327,197 B2 | 2/2008 | Kriz | |
| 7,343,579 B2 | 3/2008 | Coxe et al. | |
| 7,504,703 B2 | 3/2009 | Yoshida | |
| 7,504,850 B2* | 3/2009 | Kuboyama et al. | 326/9 |
| 7,505,300 B2 | 3/2009 | Namekawa et al. | |
| 7,515,452 B1 | 4/2009 | de Jong et al. | |
| 7,523,422 B2 | 4/2009 | Zhu et al. | |
| 7,529,118 B2 | 5/2009 | Burleson et al. | |
| 7,576,583 B2 | 8/2009 | Kuboyama et al. | |
| 7,620,883 B1 | 11/2009 | Carmichael et al. | |
| 7,627,840 B2 | 12/2009 | Kleinosowski et al. | |
| 7,644,311 B2 | 1/2010 | Lien et al. | |
| 7,679,403 B2 | 3/2010 | Erstad | |
| 7,733,144 B2 | 6/2010 | Guo et al. | |
| 7,759,995 B2 | 7/2010 | Ishii et al. | |
| 7,761,828 B2 | 7/2010 | Miczo | |
| 7,772,874 B2 | 8/2010 | Rezgui et al. | |
| 7,773,442 B2 | 8/2010 | Kapre et al. | |
| 7,774,732 B2 | 8/2010 | KleinOsowski et al. | |
| 7,818,702 B2* | 10/2010 | Mandelman et al. | 716/118 |
| 7,864,561 B2 | 1/2011 | Liaw | |
| 7,907,461 B1 | 3/2011 | Nguyen et al. | |
| 7,961,501 B1 | 6/2011 | Ryan | |
| 7,965,540 B2 | 6/2011 | Cannon et al. | |
| 8,191,021 B2 | 5/2012 | Rezgui | |
| 8,207,753 B2 | 6/2012 | Cabanas-Holmen et al. | |
| 2007/0050740 A1 | 3/2007 | Jacobi et al. | |
| 2007/0141794 A1 | 6/2007 | Morris | |
| 2007/0236246 A1 | 10/2007 | Roper | |
| 2007/0242537 A1 | 10/2007 | Golke et al. | |
| 2008/0158747 A1 | 7/2008 | Voldman | |
| 2008/0290903 A1 | 11/2008 | Mo | |
| 2009/0044158 A1* | 2/2009 | Lilja | 716/5 |
| 2009/0184733 A1 | 7/2009 | Lilja | |
| 2009/0204933 A1 | 8/2009 | Rezgui | |
| 2009/0322411 A1 | 12/2009 | Moyer et al. | |
| 2010/0264953 A1 | 10/2010 | Lilja | |
| 2011/0175197 A1 | 7/2011 | Furuta | |
| 2012/0180005 A1 | 7/2012 | Lilja | |
| 2013/0038348 A1 | 2/2013 | Lilja | |

OTHER PUBLICATIONS

Cannon et al.; "Multi-bit Upsets in 65nm SOI SRAMs"; IEEE 46th Annual International Reliability Physics Symposium, Phoenix, 2008, pp. 195-201.
Narasimham et al.; "Effects of Guard Bands and Well Contacts in Mitigating Long SETs in Advaced CMOS Processes"; IEEE Transactions on Nuclear Science, vol. 55, No. 3, Jun. 2008.
Naseer et al.; "The DF-Dice Storage Element for Immunity of Soft Errors"; IEEE; University of Southern California, 2005, pp. 303-306.
Seifert et al.;"Multi-Cell Upset Probabilities of 45nm High-k + Metal Gate SRAM Devices in Terrestrial and Space Environments"; IEEE46th Annual International Reliability Phys.
Amusan et al., "Directional Sensitivity of Single Event Upsets in 90 nm CMOS Due to Charge Sharing", Dec. 2007, IEEE Transactions on Nuclear Science, vol. 54, No. 6, Part 1, pp. 2584-2589.
Amusan et al. "Mitigation techniques for single event induced charge sharing in a 90 nm bulk CMOS process", Published 2011, 46th Annual International Reliability Physics Symposium, IRPS 2008, IEEE, pp. 468-472.
Amusan et al., "Single Event Upsets in a 130 nm Hardened Latch Design Due to Charge Sharing", 2007, 45th Annual International Reliability Physics Symposium, IEEE, pp. 306-311.
Lee et al., "Design Framework for Soft-Error-Resilient Sequential Cells", Dec. 2011, IEEE Transactions on Nuclear Science, vol. 58, No. 6, Part 1, pp. 3026-3032.
Lee et al., "LEAP: Layout Design through Error-Aware Transistor Positioning for soft-error resilient sequential cell design", 2010, International Reliability Physics Symposium, IRPS, IEEE, pp. 203-212.
Wang et al. "Low-Overhead SEU-Tolerant Latches", 2007, International Conference on Microwave and Millimeter Wave Technology, ICMMT, pp. 1-4.
Naseer et al., "DF-DICE: A Scalable Solution for Soft Error Tolerant Circuit Design", 2006, IEEE International Symposium on Circuits and Systems, ISCAS, pp. 3890-3893.
Casey et al., "Single-Event Tolerant Latch Using Cascode-Voltage Switch Logic Gates", Dec. 2006, IEEE Transactions on Nuclear Science, vol. 53, No. 6, pp. 3386-3391.
Blum et al., "Multiple Node Upset Mitigation in TPDICE-Based Pipeline Memory Structures", 2008, 51st Midwest Symposium on Circuits and Systems, MWSCAS, pp. 314-317.
Amusan et al., "Single Event Upsets in Deep-Submicrometer Technologies Due to Charge Sharing", Sep. 2008, IEEE Transactions on Device and Materials Reliability, vol. 8, No. 3, pp. 582-589.
Kim, Yong Tae and Sun II Shim, "Electrical analysis of Metal-Ferroelectric-Semiconductor Field-Effect Transistor with SPICE combined with Technology Computer-Aided Design", Journal of the Microelectronics & Packaging Society, 2005, vol. 12, No. 1, pp. 59-63. (English abstract).
Lee, Hoong-Joo and Jun-Ha Lee, "Computer Modeling of Impurity Diffusion in Poly-silicon for Display Devices", Journal of the Korea Academia-Industrial Cooperation Society, 2004, vol. 5, No. 3, pp. 210-217. (English abstract).
Benedetto et al., "Heavy Ion-Induced Digital Single-Event Transients in Deep Submicron Processes", IEEE Transactions on Nuclear Science, vol. 51, No. 6, Dec. 2004, pp. 3480-3485.
Mitra et al., "Combinational Logic Soft Error Correction", International Test Conference, 2006, ITC, IEEE International, pp. 1-9.
Gadlage et al., "Modeling and verification of single event transients in deep submicron technologies", 2004, IEEE 42nd Annual International Reliability Physics Symposium Proceedings, pp. 673-674.
Nicolaidis, M. "Design for soft error mitigation", IEEE Transactions on Device and Materials Reliability, Sep. 2005, vol. 5, Issue 3, pp. 405-418.
ACCURO™ User's Manual, Robust Chip, 2007, 133 pages.
Baumann, Robert C., "The Impact of Technology Scaling on Soft Error Rate Performance and Limits to the Efficacy of Error Correction", IEDM, 2002, pp. 329-332.
Baumann, Robert C., "Radiation-Induced Soft Errors in Advanced Semiconductor Technologies", IEEE Transactions on Device and Materials Reliability, Sep. 2005, vol. 5, No. 3, pp. 305-316.
Lilja, Klas, "Simulation Techniques for SEEs and Single Event Multiple Upset (SEMU) in ≤ 90 nm Technologies", Robust Chip Inc., 2007, Single Event Effects Symposium, pp. 1-4.
Nguyen et al., "Chip-Level Soft Error Estimation Method", IEEE Transactions on Device and Materials Reliability, Sep. 2005, vol. 5, No. 3, 365-381.
Seifert et al., "Radiation-Induced Soft Error Rates of Advanced CMOS Bulk Devices", 2006, 44th Annual International Reliability Physics Symposium, San Jose, pp. 217-225.
Office Action mailed Jan. 27, 2012 in U.S. Appl. No. 12/763,139.
Office Action mailed Apr. 3, 2012 in U.S. Appl. No. 12/763,139.
Office Action mailed Aug. 17, 2012 in U.S. Appl. No. 12/763,139.
Notice of Allowance mailed Mar. 29, 2013 in U.S. Appl. No. 12/763,139.
Applicant-Initiated Interview Summary mailed Mar. 29, 2013 in U.S. Appl. No. 12/763,139.
Office Action mailed Dec. 1, 2010 in U.S. Appl. No. 12/101,808.
Notice of Non-Compliant Amendment mailed May 6, 2011 in U.S. Appl. No. 12/101,808.
Office Action mailed Jun. 21, 2011 in U.S. Appl. No. 12/101,808.
Notice of Abandonment mailed Feb. 1, 2012 in U.S. Appl. No. 12/101,808.
Office Action mailed Feb. 25, 2011 in U.S. Appl. No. 12/354,655.
Office Action mailed Apr. 21, 2011 in U.S. Appl. No. 12/354,655.
Notice of Non-Compliant Amendment mailed Sep. 7, 2011 in U.S. Appl. No. 12/354,655.
Office Action mailed Nov. 3, 2011 in U.S. Appl. No. 12/354,655.

(56) References Cited

OTHER PUBLICATIONS

Examiner-Initiated Interview Summary and Notice of Abandonment mailed Jun. 11, 2012 in U.S. Appl. No. 12/354,655.
Notice of Allowance mailed Feb. 22, 2013 in U.S. Appl. No. 13/425,231.
U.S. Appl. No. 13/463,704, filed May 3, 2012.
U.S. Appl. No. 13/463,706, filed May 3, 2012.
U.S. Appl. No. 13/692,800, filed Dec. 3, 2012.
Supplementary Partial European Search Report for EP 09702623 dated Dec. 14, 2012.
Haixia et al., "Design of a Low Power Radiation Hardened 256K SRAM", Solid-State and Integrated Circuit Technology, 2006, ICSICT, $8^{th}$ International Conference, IEEE, Oct. 23, 2006, pp. 1646-1648.

* cited by examiner

☐ = NWELL REGION
▦ = NWELL CONTACT
▰ = PWELL CONTACT
▨ = GATE CONTACT (for the mosfet who's drain is adjacent)
▧ = GATE CONTACT (may have a different gate length than the green gates)
░ = GATE CONTACT (may be omitted), but p1 and 6a are physically separate drains)

PWELL/ SUBSTRATE REGION
(SURROUNDING
THE NWELL REGIONS)

☐ = NWELL REGION  
▦ = NWELL CONTACT  
▤ = PWELL CONTACT  
▨ = GATE CONTACT (for the mosfet who's drain is adjacent)  
▩ = GATE CONTACT (may have a different gate length than the green gates)  
░ = GATE CONTACT (may be omitted), but adjacent drains are physically separate)

PWELL/ SUBSTRATE REGION (SURROUNDING THE NWELL REGIONS)

LAYOUT METHOD FOR SOFT-ERROR HARD ELECTRONICS, AND RADIATION HARDENED LOGIC CELL

CROSS REFERENCE TO RELATED APPLICATIONS

This application is a divisional application, claiming the priority of U.S. application Ser. No. 12/354,655, Entitled: "Layout Method for Soft-Error Hard Electronics, and Radiation Hardened Logic Cell", filed Jan. 15, 2009, also claiming priority to U.S. application No. 61/011,599, Entitled: "Layout Methodology for Soft-Error Hard Electronics", filed Jan. 17, 2008, also claiming priority to U.S. provisional application No. 61/011,989, Entitled: "Robust Cell Layout Synthesis Methodology for Soft-Error Hard Electronics", filed Jan. 22, 2008, also claiming priority to U.S. provisional application No. 61/068,483, Entitled: "Circuit and Layout for a Radiation Hard Sequential Circuit Element", filed Mar. 7, 2008, also claiming priority to U.S. provisional application No. 61/123,003, Entitled: "Design Technique, and Layout and Circuit Configurations, for Radiation Hardening of Logic Circuits", filed Apr. 5, 2008, which are incorporated herein by reference.

GOVERNMENT SUPPORT

This invention was made with Government support under W31P4Q-06-C-0097 awarded by DARPA and FA9451-06-C-0383 awarded by DTRA. The Government has certain rights in the invention.

BACKGROUND OF THE INVENTION

1. Field of the Invention

This invention comprises a layout method to effectively protect logic circuits against soft errors (non-destructive errors) and circuit cells, with layout, which are protected against soft errors. In particular, the method protects against cases where multiple nodes in circuit are affected by a single event. These events lead to multiple errors in the circuit, and while several methods exist to deal with single node errors, multiple node errors are very hard to deal with using any currently existing protection methods. The method is particularly useful for CMOS based logic circuits in modern technologies ($\leq$90 nm), where the occurrence of multiple node pulses becomes high (due to the high integration level). It uses a unique layout configuration, which makes the circuits protected against single event generated soft-errors.

The problem of soft errors generated by single event transients (and single event upsets) is expected to increase drastically in ultra-deep submicron ($\leq$90 nm) technologies. Of particular significance is that logic circuits are expected to become much more sensitive to radiation generated soft-errors and possibly surpass memory as the major source of single event errors. Furthermore, the generation rate of multiple errors, multiple bit upsets (MBU), single-event multiple upset (SEMU) increases.

The main reason for this is that, with a higher feature integration and higher frequencies, the spatial distribution and pulse length of a single event transient (SET) becomes relatively larger, increasing the probability that an SET pulse is latched-in as a (soft-) error, or that SET pulses are generated simultaneously on several circuit nodes by one single event.

The problem with increasing soft-error rates is further complicated by the escalating cost of semiconductor design and manufacturing. The high cost involved in developing and maintaining a semiconductor FAB makes it highly desirable to use standard commercial semiconductor manufacturing also for applications that require a high radiation tolerance. Hence, there is a strong drive to develop efficient and robust radhard-by-design (RHBD) techniques for these applications.

Furthermore, the design process is also becoming very complex and expensive, and it would be highly desirable to be able to re-use standard design IP and libraries as much as possible for radhard applications.

2. Prior Art

Current radhard-by-design technology for single event errors include triplication (triple mode redundancy, TMR) or duplication (e.g., built-in soft-error resilience, BiSER). These circuits carry two or more redundant copies of a signal, and use some form of voting, or filtering, circuitry to determine the correct signal among the redundant signals. Filtering preventing a signal to pass in the case that one of the redundant signals is wrong (by comparing the value of the redundant signals), and voting circuits selects the correct signal from the majority among several (3 or more) redundant signals.

These techniques generate undesirable power and area overhead, and current versions of these techniques cannot handle MBUs or SEMUs. Error correction codes, ECC, for memory, which also (loosely) could be classified as RHBD, is more efficient than duplication/triplication and can, with additional overhead, handle multiple errors in memory circuitry. However, the application of a corresponding error correction to logic circuits is very limited and application specific (e.g., selective parity check or insertion of specialized checking circuit IP).

State-of-the art for layout techniques for soft-error hard design mainly consist of simple spacing and sizing, and in adding additional contacts.

BRIEF SUMMARY OF THE INVENTION

A radiation generated single event (soft-) error (SEE) occurs when the charge, generated in the semiconductor material by one or more (e.g. secondary) charge particles, is collected by contact areas on the semiconductor substrate. This leads to current pulses on the circuit nets, connected to these contact areas, which, in their turn, cause voltage pulses in the circuit which can upset a sequential element (latch, flip-flop) or propagate through combinational logic and be latched in as errors at the next sequential element in the circuit.

This invention comprises a unique new layout method, which takes advantage of the overall circuit response to a single event effect, and, furthermore, comprises circuit cells, with layout, which are protected against soft errors. The method uses an arrangement of critical contact areas in such a way that single event pulses in the circuit, that are generated on multiple nodes, act to oppose each other and hence cancel (or greatly reduce the effect of the single event). In the case that a primary and secondary circuit is used to maintain, or process the signal in a circuit, addition rules, described in section 4, are used, so that no possibility remains that a error is generated in both primary and secondary circuit, and hence that the combination of primary and secondary circuit will be fully error free.

BRIEF DESCRIPTION OF THE DRAWINGS AND FIGURES

Table 1. The state for the nodes in a circuit that uses a primary (nodes n1,n2) and secondary (nodes n3,n4) circuit for storage or processing of the state.

FIG. 4 illustrates one embodiment of a first preferred layout arrangement for the layout of the DICE latch cell. ns/ps are the source contacts for the two mosfets whose drains are adjacent. p1-p4 and n1-n4 are the pMOSFET drains and the nMOSFET drains of the 4 main storage nodes, respectively. Any cyclic simultaneous permutation of the n and p nodes will be equivalent (and part of the invention). The mosfets can be placed in separate active areas, or the adjacent n and p nodes can be placed in the same active area. The MOSFET sources can be placed in the line of the drains or in the direction vertical to the line of the drain nodes. The well contacts can be placed on either side only, or also surround the adjacent node pairs. The nodes can also be arranged in a different order subject to the following rules: two adjacent n-drains, or two adjacent p-drains are always an odd/even pair (e.g., p1 & p2, or n2 and n3), adjacent n-drain to p-drain are always an odd/odd or and even/even pair (e.g., n2 & p2, or p3 & n1).

FIG. 12 illustrates one example of a duplicated circuit of claims 9 AND 10. In a duplicated inverter where the redundant and primary nodes carry opposite states, error signals on both primary and redundant nodes can be generated if both ndrain0 and pdrain1 are affected (if D is high) or if both ndrain1 and pdrain0 are affected (D low). By placing the nodes such, that if a particle trace goes through two nodes that can cause an error transient on both primary and redundant output, then the trace also passes through the other nodes and the pulse on one of the nets are suppress'ed. For example, consider the trace in the figure; if node 0 is high, the charge collected on ndrain0 will pull node 0 low (error transient), the charge collected on node pdrain1 will pull node 1 high, however, the charge collected on node ndrain1 will pull node 1 low, opposing the effect on pdrain1, and keeping node 1 low (i.e., preventing the transient on node 1). If node 0 is low, the charge collected on node ndrain1, will pull node 1 low (error transient), however, the charge collected at ndrain0, will keep node 0 low (i.e., preventing a transient on node 0). It should be pointed out that in the general case there will be some pulses on all nodes, but that it will always hold true that a full swing pulse (a transient that can propagate) only can be generated on one, and one only, of the duplicated nodes.

DETAILED DESCRIPTION OF THE INVENTION AND HOW IT WORKS

This invention comprises a unique new layout method, which takes advantage of the overall circuit response to a single event effect. It also includes specific circuit cells with layout, which have been constructed in accordance with the new layout method.

A radiation generated single event (soft-) error (SEE) occurs when the charge, generated in the semiconductor material by one or more (e.g. secondary) charged particles, is collected by contact areas. The contact areas are the low resistivity regions on, or in, the semiconductor substrate, which are connected to a net in the circuit, e.g., the source and drain areas in a MOSFET technology. A circuit net (or node) refers to a part of the circuit, connected by low resistivity regions (metal), which maintains a certain voltage value (referred to as the voltage state of the net) throughout its' extent. A net can be connected to any number of contact areas.

The charge collected by contact areas during a single event, leads to current pulses in the circuit, which, in their turn, cause a change in the voltage of the circuit nets, connected to these contact areas, i.e., a voltage pulse in the circuit. These pulses can upset a sequential element (latch, flip-flop) or propagate through combinational logic (i.e., a set of digital logic gates) and be latched in as errors at the next sequential element in the circuit.

The effect of a single event on the voltage on the circuit net, is different for different contact areas, e.g., a single event can have the effect of increasing the voltage on the net connected to the contact area, or decreasing it, depending on where the contact areas are located in substrate, and how they are connected to the circuit. The method in this invention uses an arrangement of contact areas in such a way that single event generated pulses in the circuit, that occur on multiple contact areas, acts to oppose each other, with respect to the effects they have on the voltage of the circuit nets, and hence cancel (or greatly reduce the effect of the single event).

The method also comprises an adjustment the strength of the effect a single event has on the voltage of the circuit nets, when this is desirable to achieve the desired total effect on the circuit. This adjustment can be achieved by changing the sizes of the contact areas, and by changing their positions relative to other components in the layout.

The method can be applied to sequential logic elements (latches, flip-flops, memory cells), to combinational logic (a connection of one or more digital logic gates), or to analog circuit cells.

In the following two section details of two specific ways to apply the method are described. The first, section 4.1, uses a placement, and strength adjustment, such that the single event effects, on several contact areas, cancel out each other, in terms of their effect on the circuit nets they are connected to. The second, section 4.2, uses a placement, and strength adjustment, such that two, or more, redundant nets in the circuit, are affected differently by a single event, in such a way that a single event cannot simultaneously change their voltage state on several of the redundant nets.

A. Layout Method Using Symmetric Arrangements—Method 1

The key steps in method one of the invention are:

1. Identify which contact areas have opposing effects on the circuit nets when they are simultaneously affected by a single event 2. Place these nodes in the layout next to each other, and in a fully symmetric way with respect to other adjacent contact areas a. In particular in a CMOS technology the contact are configured in a symmetric (equivalent) position with respect to well junctions and well contacts b. If the two contact areas are part of a sequential element (e.g., a latch), this arrangement ensures that these two nodes cannot be upset by a single event that affects both areas, i.e., an event which has an extended charge (e.g., as generated by a charged particle passing through) which is in such a direction that it affects both these nodes. c. If nodes are part of a combinational element, the arrangement ensures that the generated output pulse is greatly suppressed, when the generation single event affects both nodes, i.e., an event which has an extended charge (e.g., as generated by a charged particle passing through) which is in such a direction that it affects both these nodes.

3. In an element using additional protective circuitry (redundant nets), place the contact areas of the redundant nets in a direction, which is such that when the charge from one single event effects both primary, and secondary nets, it is in the direction which is such that it always also affects both opposing nodes in either the primary or the secondary circuit, or that it affects the opposing node of both primary and secondary circuit.

Specifically for CMOS technology, step one and two above would use the following to characterize the effect of a single event on a source or drain contact area: a. When an n-drain (or source) is affected by a single event, the effect of the single event is to reduce the voltage on the net connected to this contact area, i.e., if the node is high is will tend to switch the voltage, when the node is low, it will not tend to switch the voltage. b. When an n-drain (or source) is affected by a single event, the effect of the single event is to reduce the voltage on the net connected to this contact area, i.e., if the node is high is will tend to switch the voltage, when the node is low, it will not tend to switch the voltage.

Also, specifically for a CMOS technology, step 3 above, would use the following rules for two nodes, each connected to a net carrying redundant signals (primary and secondary nets): a. When two n-drains (or sources), one connected to the primary net and one to the secondary net, are affected by a single event, and they always have opposite voltage states, then only one of the primary/secondary nets can be upset (i.e., change its' voltage). b. When two p-drains (or sources), one connected to the primary and one to the secondary net, are affected by a single event, and they always have opposite voltage states, then only one of the primary/secondary circuits can be upset. c. When an n-drain (or source) from one net, and a p-drain (or source) from the other net is affected, are affected by a single event, and the nets connected to these drains (sources) always have the same voltage state, then only one of the primary/secondary nets can be upset.

B. Layout Method Using Asymmetric Arrangements—Method 2

For the case of an element that uses primary and redundant nets to store the state (i.e., the voltage or signal), an alternative to synthesizing a layout where single event effects cancel out each other, is to deliberately let one of the contact areas be stronger with respect to single event charge collection. This contact area will then always determine the outcome of a single event in on the connected net (e.g., for a p-drain it would always end up HIGH (at Vdd)). When there are four nets that store the state (2 primary nets, two redundant nets), and we make sure that net connected to the contact areas that is made dominant in the primary circuit part, stores the opposite state to the net connected to the contact area that is made dominant in the redundant circuit part, then only one of the two redundant circuit parts can be upset by an event that affects both circuit parts. Using this variant, the robust cell synthesis methodology would be as follows:

For designs that use primary and redundant nets to store a state: a. Identify which contact areas have opposing circuit effects when they are simultaneously affected by a single event (in the primary as well as the redundant part) b. Place these nodes in the layout next to each other, and make one of the nodes dominant with respect to a single event (e.g., by making the drain area larger, and changing the distance to the well-junction and the well-ties). c. Make sure that the net connected to the dominant contact area of the primary circuit part, stores the opposite state to the net connected to the dominant contact area in the redundant circuit part. d. Place the primary and redundant contact areas, relative to each other, in such a way that a single event the affects both the primary and redundant circuitry, also always affects both the dominant and the non-dominant nodes in the primary and in the redundant part. (i) In this way, either the primary or the redundant pail will be in a state where the dominant node will make sure this circuit part cannot be upset (i.e. change its state or voltage). Hence, in any situation only ONE of the redundant parts can be upset by a single event.

C. Discussion, Clarification, and Specific Circuit Cells

Figure 1:
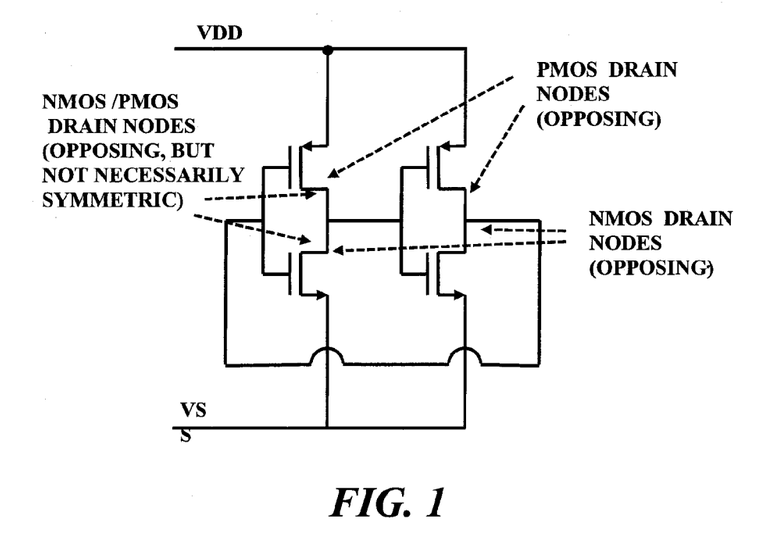
FIG. 1 illustrates one embodiment of primary opposing nodes in a latch cell.

In a basic sequential logic circuit element (latch, sram-type memory cell, etc.) there are two main nets that maintain the state. These will always have opposite state (voltage). FIG. 1 shows the schematics of the fundamental components of a latch circuit implemented in a CMOS technology. In this latch, each of the two (main) net is connected to two contacts areas in the layout (the nmos device drain and the pmos drain).

Figure 2:
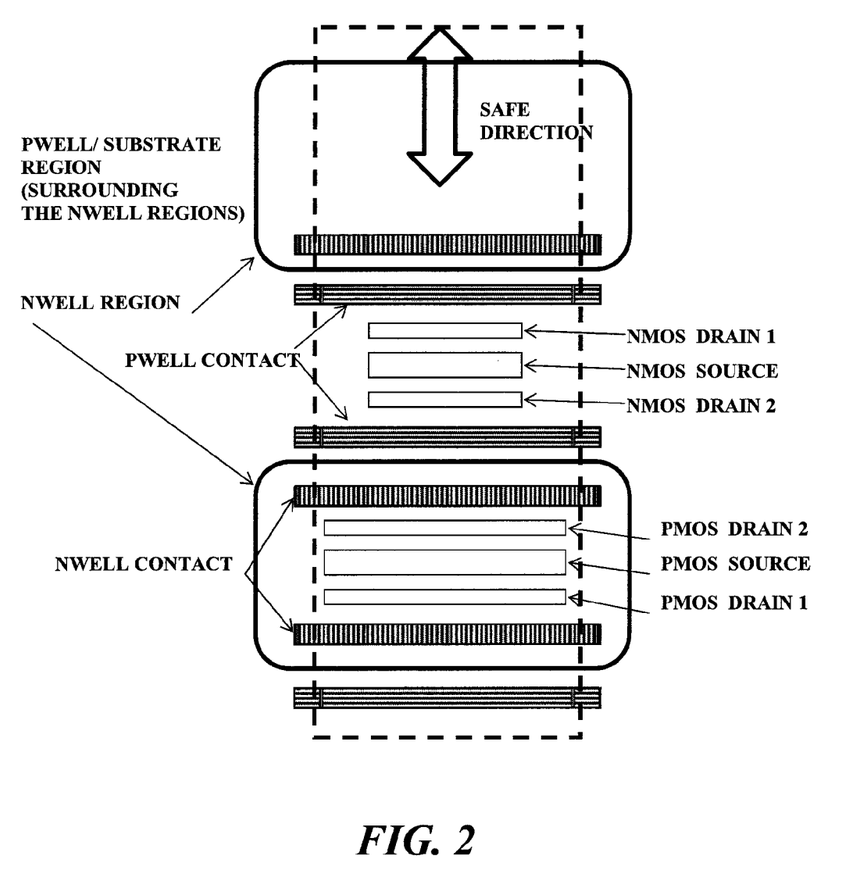
FIG. 2 illustrates one embodiment of a principal arrangement of opposing node of a latch circuit.

In this configuration the contact areas that will have opposing effects with respect to the state of the latch, when affected by the same single event, can be identified as (step 1 above): a. A single event that affects both pmos drains will have opposing effects on the state of the latch b. A single event that affects both nmos drains will have opposing effect on the state of the latch b. A single event that affects both nmos and pmos drain of the same node will have opposing effect on the state of the latch In the symmetric method, we arrange the layout such that drains, with opposing effects, are placed next to each other, in a symmetric arrangement (i.e. with respect to symmetric and with respect to the surrounding layout, and having the same shape). This is step 2 in the methodology number 1 above. FIG. 2 shows such an arrangement where we have utilized the first two of the opposing contact area identifications above. We now have a latch which cannot be upset if the single event has such a directions that is passes the two nets of the circuit.

Step 3 in methodology number 1, as well as method number 2, concerns the case when an additional (redundant) circuit (here a latch) is available. In a circuit configuration that uses two latches to maintain the states, there will be 4 main nodes, n1, n2, from the primary latch, and n3, n4, from the secondary latch. The nodes from one latch will be in opposite states, and, during correct circuit operation, each node in the primary latch will always have the same state as one node in the secondary latch. This situation is shown in table 1, where n1 and n3 maintain the same state, and n2 and n4 maintain the same state.

Figure 11:
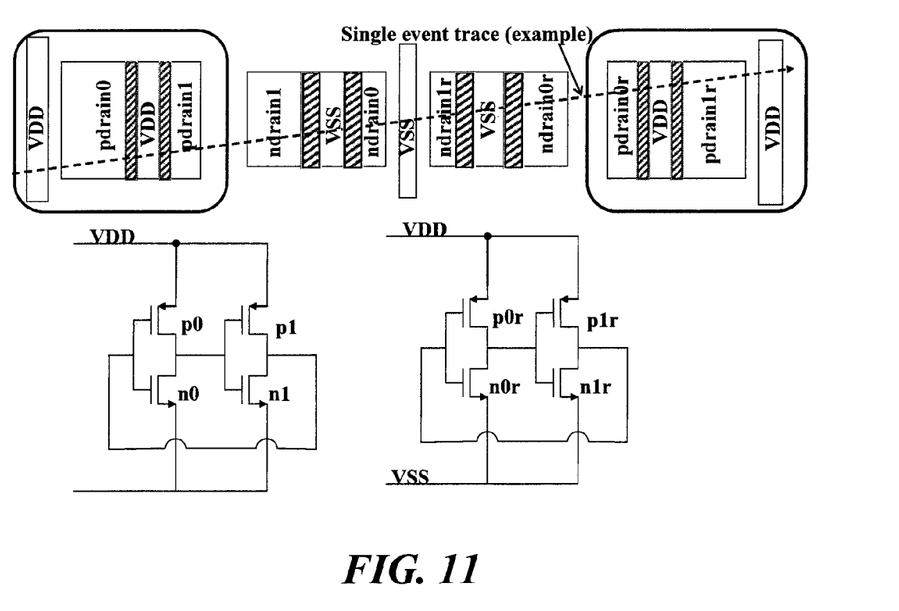
FIG. 11 illustrates one embodiment of a circuit schematic and layout for duplicated latch cells (e.g. for BISER) using placement and sizing to ensure complete hardness against single and multiple node single event effects. For a single event affecting several nodes, the primary latch can only be upset when node 1 is HIGH, and the redundant latch can only be upset when node 1 (r) is LOW. Hence, any single event that affects both latches, can only upset one of the two latches in the BISER configuration, and therefore, cannot generate an error.

According to step 3, the nodes of the second latch are now placed, with respect to the first latch, such that when an extended event occurs that affects both latches, it will be in a direction which affects both opposing nodes in each individual latch, or at least in one of them. FIG. 11 shows such an arrangement, where the method with dominating nodes (methodology 2 above) has been used, and the two latches have been placed in such a way relative to each other that at the most, one of the latches can be upset, by any single event, but not both.

The same situation is the same also for other sequential elements (e.g., memory cells) and the method applies to these elements as well. The method also applies to elements which uses more than 2 nodes to maintain the state, as well as non-sequential elements with a primary and secondary redundant net.

TABLE-US-00001 TABLE 1 The state for the nodes in a circuit that uses a primary (nodes n1, n2) and secondary (nodes n3, n4) circuit for storage or processing of the state. Node: n1 n2 n3 n4 State 0 0 1 0 1 State 1 1 0 1 0

To extract the correct signal from the two, or more, redundant nets, a filtering, or voting circuit is used. The filtering ensuring that at any time where one of the redundant nets is wrong (e.g., for the redundant nets carrying the same voltage state; if the voltage states differ) the signal is not allowed to pass through the filtering circuit. The Built-In Soft Error (BISER) design [Mitra2005] is an example of such a configuration. A voting circuit, being used on at least 3 redundant circuit, performs a vote between the voltage states of the redundant nets. Triple mode redundancy (TMR) configurations use this type of redundancy.

Figure 3:
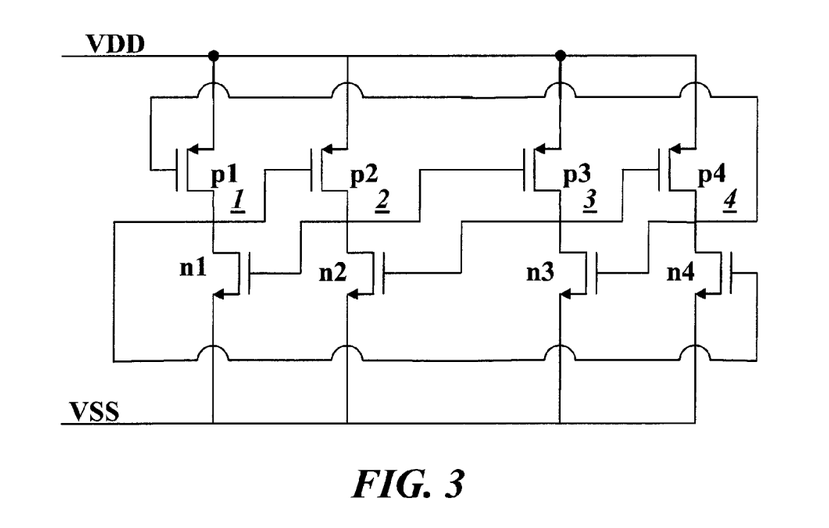
FIG. 3 illustrates one embodiment of a basic netlist for the DICE latch cell (prior art [Nic05]) with nodes 1-4. p1-p4 and n1-n4 are the pMOSFET drains and the nMOSFET drains, respectively.

This invention also comprises several specific DICE cells, created using the layout method. The DICE (Dual Interlocked Cell) latch [Nic2005], the circuit of which is shown in FIG. 3, also uses four nets to store the circuit state, but as can be seen in FIG. 3, they are not connected as two separate latches, but in an interlocked way.

Figure 4:
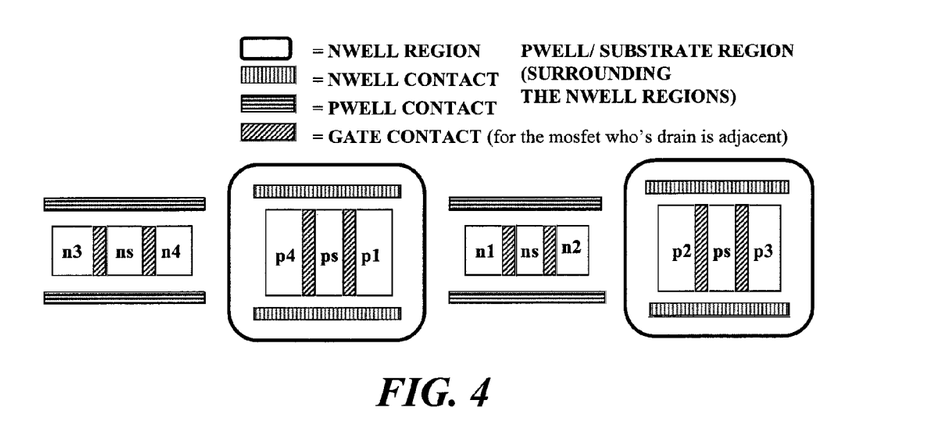

The principal arrangement of the 4 storage nets, of the DICE cells in this inventions, is that the contact areas of the nets are placed along one direction (e.g., FIG. 4), and that they have a certain order, than minimizes or removes the effect of the single event, and hence reduces or removes the possibility that the storage element can be upset by a single event. The first variant (variant 1) is shown in FIG. 4. In this variant the MOSFET pairs have been placed in the same active area with a common MOSFET source contact in-between. However, they can also be placed in separate active areas, using separate sources contacts, and they can also be oriented so that the sources are perpendicular to the direction of the drain nodes.

Figure 5:
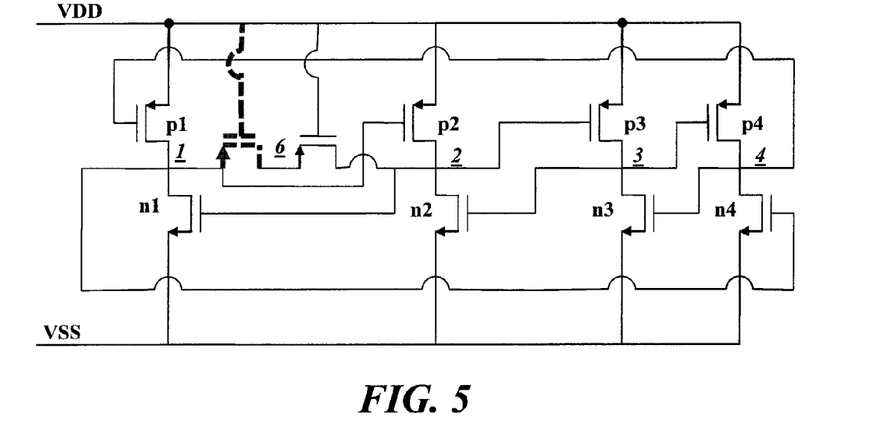
FIG. 5 illustrates one embodiment of a net-list corresponding to the second preferred arrangement. The yellow MOSFET may or may not be included, as long as node 6 is connected to drain 6a in FIG. 5, and p1 and 6a are physically separate.
Figure 6:
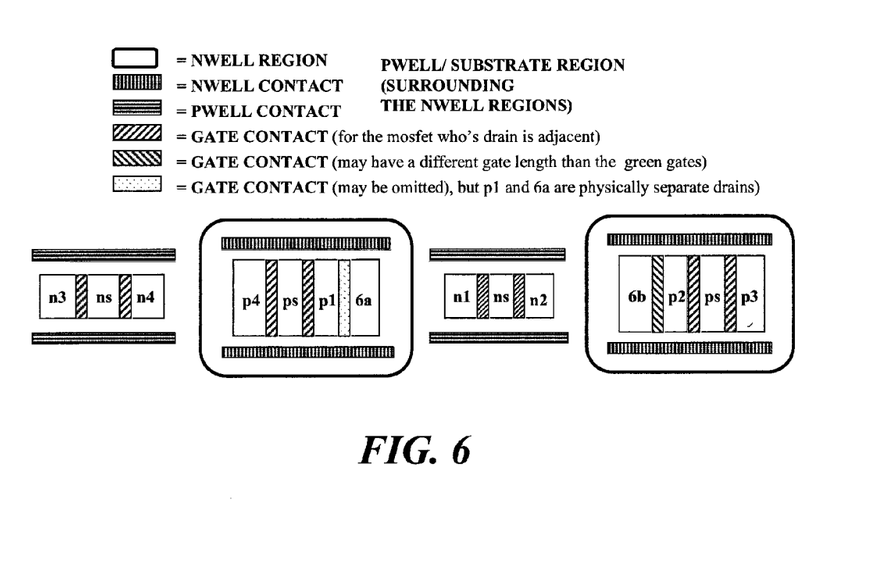
FIG. 6 illustrates one embodiment of a second preferred layout arrangement. ns/ps are the source contacts for the two mosfets whose drains are adjacent. Node 6a and 6b are connected. The yellow gate adjacent to node 6a may or may not be included (both variants included in the claims), but p1 and 6a are physically separate. The layout derives from the layout in FIG. 1, and the same variants with respect to node permutations, active, source, and well contact arrangements apply.
Figure 7:
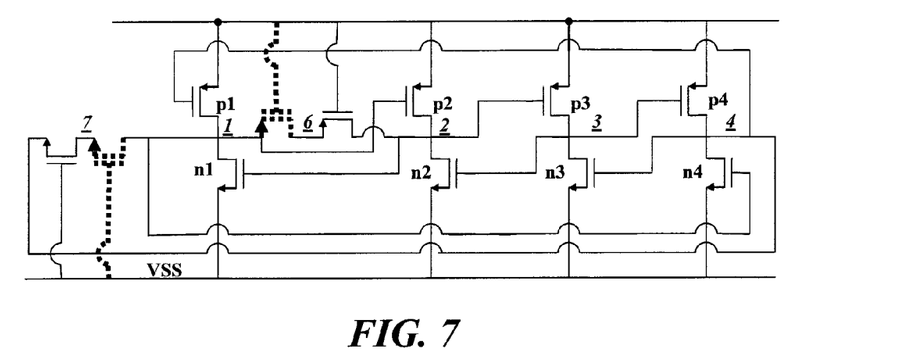
FIG. 7 illustrates one embodiment of a net-list corresponding to the third preferred arrangement. The yellow MOSFET may or may not be included, as long as node 6 is connected to drain 6a in FIG. 4, and p1 and 6a are physically separate, and node 7 is connected to drain 7a in FIG. 4, and n1 and 7a are physically separate.
Figure 8:
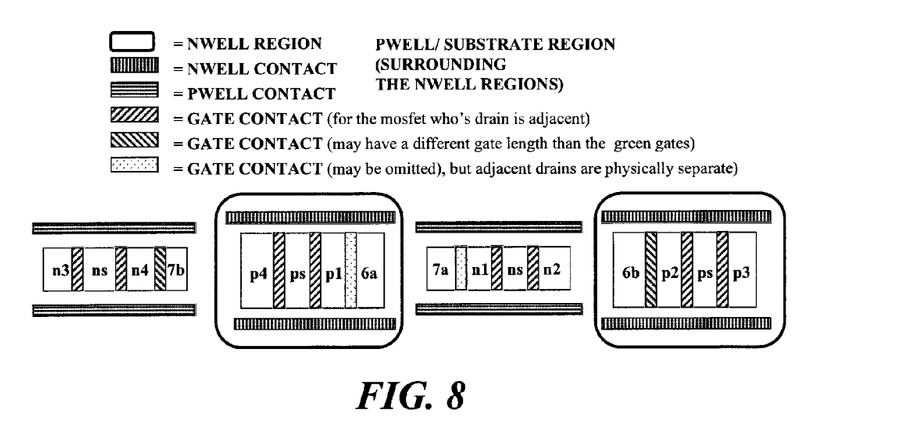
FIG. 8 illustrates one embodiment of a third preferred layout arrangement. ns/ps are the source contacts for the two mosfets whose drains are adjacent. Node 6a-6b are connected, as are node 7a/7b. The yellow gate adjacent to node 6a and 7a may or may not be included (both variants included in the claims), but the adjacent drain areas are physically separate. The layout derives from the layout in FIG. 1, and the same variants with respect to node permutations, active, source, and well contact arrangements apply.
Figure 9:
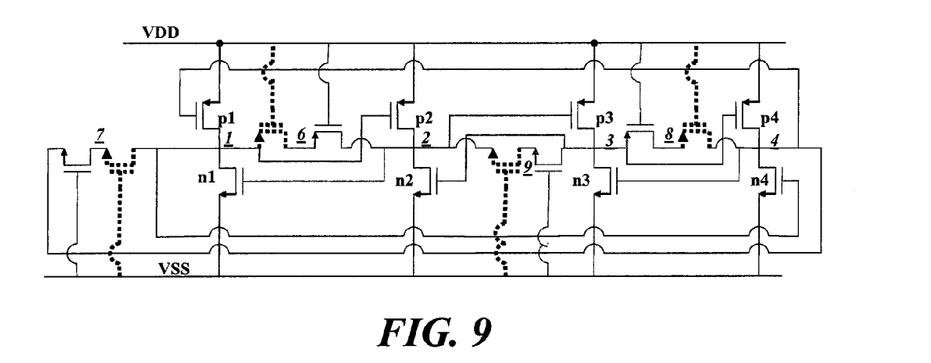
FIG. 9 illustrates one embodiment of a net-list corresponding to the fourth preferred arrangement. The yellow MOSFET may or may not be included, as long as node 6 is connected to drain 6a, 7 to 7a, 8 to 8a, and 9 to 9a in FIG. 8, and 6a, 7a, 8a, 9a are physically separate from their adjacent main drain node.
Figure 10:
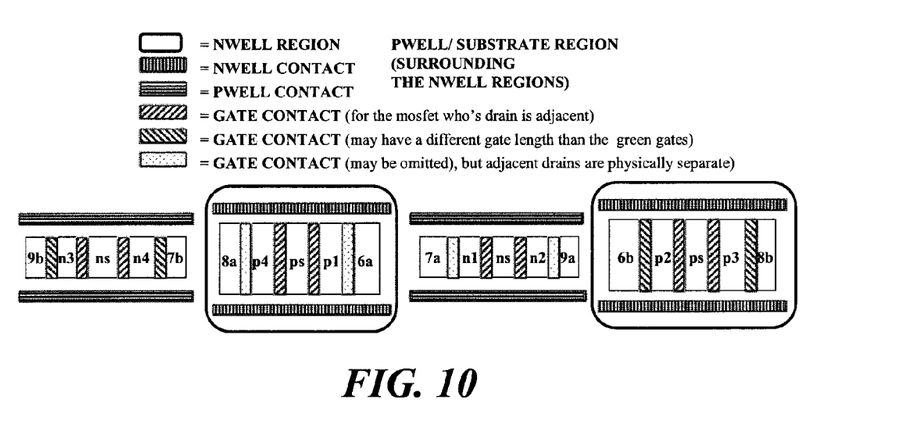
FIG. 10 illustrates one embodiment of a fourth preferred layout arrangement. ns/ps are the source contacts for the two mosfets whose drains are adjacent. Node 6a/6b, 7a/7b, 8a/8b, and 9a/9b are connected. The yellow gates adjacent to nodes 6a, 7a, 8a, 9a may or may not be included (both variants included in the claims), but nodes 6a, 7a, 8a, 9a are physically separate from their adjacent MOSFET drains. The layout derives from the layout in FIG. 1, and the same variants with respect to node permutations, active, source, and well contact arrangements apply. Naturally the claims also cover the various additional variants where any combination of the extra nodes 6a/6b, 7a/7b, 8a/8b, 9a/9b have been included or omitted.

In variants 2-4 (FIGS. 5-10) protective nodes have been added. They act to protect certain sensitive node-pairs and are not (necessarily) active during normal circuit operation. However, they can also be used as active devices connecting their gates to other storage nodes. For example, while variant 1 is much more robust than the normal layout (which does not have other nodes in between the sensitive node pairs), there are still some single event sensitivity remaining, the main being for the node pair p1-n2. By extending variant one as shown in FIGS. 5-6, the node pair p1-n2 is also protected. This is variant 2. The most sensitive node pair in variant 2 is the n1-p4 node pair, this pair is protected with the extension in variant 3 (FIGS. 7-8). Finally the latch can be made symmetric by adding additional protective nodes. A fully symmetric arrangement of protective nodes is shown in FIGS. 9-10 (fourth variant).

Figure 13:
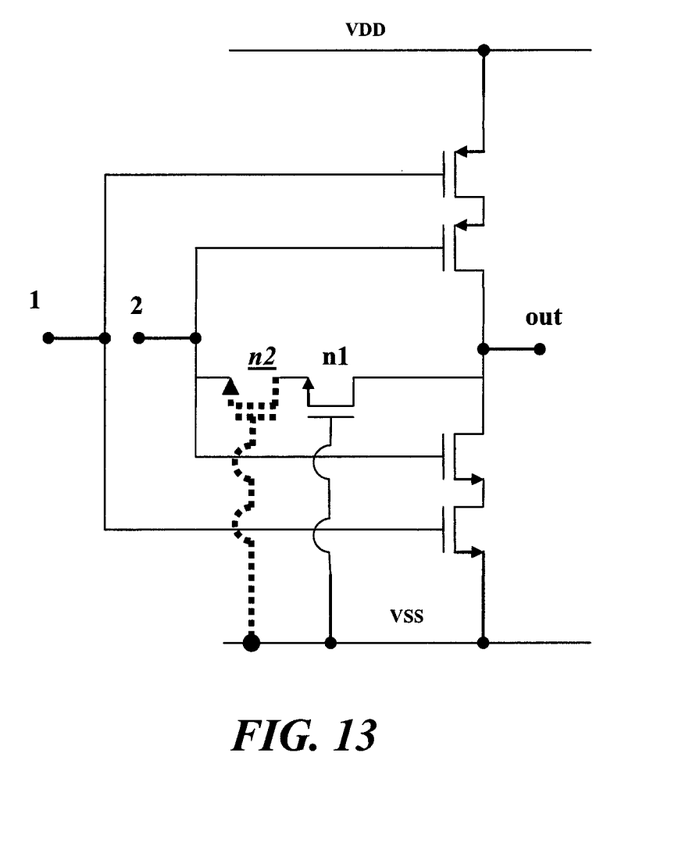
FIG. 13 illustrates one embodiment of a protective device for a c-element filtering circuit.

The addition of additional protective MOSFETs has a general application to circuits which uses redundant nets. In the same way as in the case of the DICE circuit, they can be used to keep the state of a circuit node which becomes floating (not connected to the power, i.e., to VSS or VDD) during a single event. Floating nets become very sensitive to the single event charge, their voltage state can change very easily (i.e., even by very weak interaction with the single event). The additional protective devices, even if they just turn on partially during the single event, will make the nodes, that become floating during a single event, much more stable. Another (not DICE) example of the addition of such protective devices for a c-element filtering circuit is shown in FIG. 13.

Figure 12:
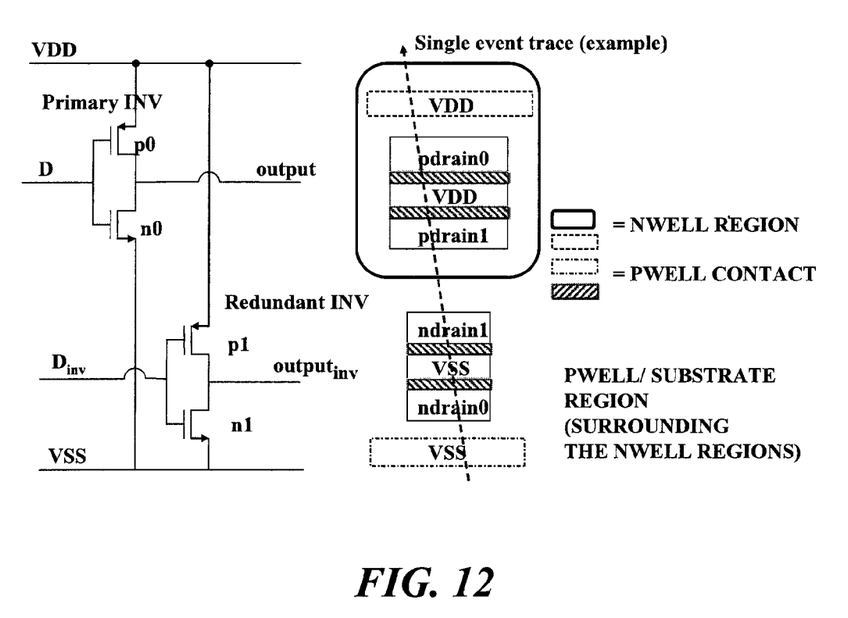

The invention also comprises a combinational circuit where all, or some of the nets have been duplicated, in such a way that there is one (primary) net that carries the signal, and a second (redundant) net carries the inverse of the signal on the primary net (i.e., when the voltage on the primary net is high, the voltage on the redundant net is always low, and vice versa), and where, in accordance with the layout method, the contact areas of the primary and redundant net, are placed in such a way that when a single event affects both nets, a voltage pulse can only be generated on one of the nets, but not on both. For this type of duplicated combinational circuit, a filtering also needs to be applied to the outputs (at some point before the signal is latched into a single sequential element), which prevents propagation of a signal, unless both nets have their correct state (i.e., one being the inverse of the other). Alternatively sequential elements can also be duplicated, and an error detection and correction added at some point in the circuit (an error being identified by comparing the signal on the two redundant nets). This type of duplicated combinational circuit is shown in FIG. 12.

The invention claimed is:

1. A sequential logic or memory cell and layout, comprising two or more latches, each latch having at least one net that stores a voltage state having a value, and at least one net that stores an opposite value, inverse, of the voltage state, comprising:
   a. an arrangement of contact areas of each net of each latch, which keep a certain voltage state or its inverse, in such a way that the contact areas of at least 4 of these nets are positioned along one line in the layout, and positioned relative to each other such that two contact areas which are placed next to each other:
      i. are part of nets which carry the same voltage state, and for which a single event has an opposite effect on the voltage state of the net to which the contact area belong; or
      ii. are part of different nets, which carry different voltage states, a certain state and its inverse, and for which said single event has the same effect on the voltage of the net.

2. The sequential logic or memory cell and layout of claim 1 wherein at least two of said latches are redundant latches, said cell and layout further comprising:
   a. a filtering or voting circuit connected to outputs of redundant nets of the redundant latches, wherein the filtering circuit for two redundant nets of two redundant latches is configured to prevent a data signal to pass unless both redundant nets have the correct data, and for three or more redundant nets of three or more redundant latches, said voting circuit is configured to vote between the states of the redundant nets; and
   b. a layout where the strength of the response to the single event has been adjusted such that the total effect, caused by the single event on a primary net of said at least 4 nets, is opposite to the total effect caused by said single event on its redundant counterpart net, such that when said single event affects both said primary net and said redundant counterpart net, one and only one, of these nets can change its state.

3. The sequential logic or memory cell and layout of claim 2 wherein contact areas of a redundant latch of the redundant latches are positioned along said line so that opposing nodes in a primary net or a secondary net of the redundant latch are next to one another or opposing nodes of both the primary net and the secondary net of said redundant latch are next to one another.

4. The sequential logic or memory cell and layout of claim 2 wherein a redundant latch of said redundant latches comprises at least one of: (i) a first net having a pmos drain or source contact area of a p-type MOSFET transistor and a second net, having the opposite voltage state of the first net, and having a pmos drain or source contact area of a p-type MOSFET transistor and wherein said pmos drain contact areas are next to each other in said arrangement; and (ii) said first net having an nmos drain contact area of an n-type MOSFET transistor, and said second net having an nmos drain contact area of an n-type MOSFET transistor, and wherein said nmos drain contact areas are next to each other in said arrangement.

5. The sequential logic or memory cell and layout of claim 4 wherein (i) the nmos drain contact area and the pmos drain contact area of the first net are next to each other in said arrangement, and/or (ii) the nmos drain contact area and the pmos drain contact area of the second net are next to each other in said arrangement.

6. The sequential logic or memory cell and layout of claim 1 wherein contact areas of a latch are positioned along said line so that (i) opposing nodes in a first net or a second net of said latch are next to one another or (ii) opposing nodes of the first net of said latch are next to one another or (iii) opposing nodes of the second net of said latch are next to one another.

7. The sequential logic or memory cell and layout of claim 1 wherein said at least two latches form part of (i) a primary net having a dominant node and a non-dominant node comprised of primary net contact areas, and (ii) a redundant net having a dominant node and a non-dominant node comprised of redundant net contact areas, the dominant node having a contact area having an opposing circuit effect to a contact area of the non-dominant node in response to the single event, the dominant node being positioned next to the non-dominant node, the dominant node of the primary net having opposite state to the dominant node of the redundant net, the primary net contact areas and the redundant net contact areas being positioned such that the single event that affects both the primary net and the redundant net also affects both the dominant and the non-dominant nodes in each of the primary net and the redundant net.

8. The sequential logic or memory cell and layout of claim 7 wherein said dominant node of the primary net has a larger contact area or a different contact area position relative to other components of the cell than said non-dominant node.

9. The sequential logic or memory cell and layout of claim 1 wherein a first latch of said latches comprises a first net of said at least 4 nets having an nmos drain or source contact area of an n-type MOSFET transistor and a second net of said at least 4 nets, having the opposite voltage state of the first net, and having an nmos drain or source contact area of an n-type MOSFET transistor and wherein the nmos drain or source contact area of the first net and the nmos drain contact area of the second net are next to each other in said arrangement.

10. The sequential logic or memory cell and layout of claim 9 wherein a contact area which is not connected to any of the nets of said first latch, resides between said nmos drain contact areas.

11. The sequential logic or memory cell and layout of claim 1 wherein a first latch of said latches comprises a first net of said at least 4 nets having a pmos drain or source contact area of a first transistor of a p-type MOSFET transistor and a second net of said at least 4 nets, having the opposite voltage state of the first net, and having a pmos drain or source contact area of a p-type MOSFET transistor and wherein the pmos drain contact area of the first net and the pmos drain contact area of the second net are next to each other in said arrangement.

12. The sequential logic or memory cell and layout of claim 11 wherein a contact area which is not connected to any of the nets of said first latch, resides between said pmos drain contact areas in said arrangement.

13. The sequential logic or memory cell and layout of claim 11 wherein the first net further comprises an nmos drain or source contact area of an n-type MOSFET transistor and wherein the pmos drain contact area of the first net and said nmos drain contact area are next to each other in said arrangement.

14. The sequential logic or memory cell and layout of claim 13 wherein a contact area, which is not connected to any of the said at least 4 nets which are part of said first latch, resides between said nmos drain contact areas in said arrangement.

15. The sequential logic or memory cell and layout of claim 11 wherein the second net further comprises an nmos drain or source contact area of an n-type MOSFET transistor and wherein the pmos drain contact area of the second net and the nmos drain contact area of the second net are next to each other in said arrangement.

16. The sequential logic or memory cell and layout of claim 15 wherein a contact area, which is not connected to any of the said at least 4 nets which are part of said first latch, resides between said nmos drain contact areas in said arrangement.

17. An integrated electronic circuit comprising:
   contact areas categorized to identify for which contact areas a single event has opposing effects on the voltage state of nets in the circuit, and to identify for which contact areas a single event has non-opposing effects on the voltage state of the nets in the circuit, wherein the effect on the voltage state of the nets in the circuit due to a single event occurring near each of the contact areas is determined for each of the contact areas in the circuit;
   wherein the contact areas are placed in such a way that when a single event has opposing effects on the voltage state of the circuit nets, the opposing first and second contact areas are placed as close to each other as permitted by the circuit and by design rules associated with the circuit;
   a first contact area and a second contact area placed with non-opposing effects on the voltage state of the nets in the circuit, said non-opposing effects caused by a single event, wherein the first and second contact areas are non-adjoining, and a third contact area is placed in between the first and second contact areas, wherein said third contact area has an effect on the voltage state of the nets in the circuit opposing those of the first and second contact areas, and wherein the effect of the third contact area on the voltage state of the nets in the circuit is caused by a single event; and
   wherein the strength of the effect of a single event on the placed contact areas is selected such that the opposing effects are of substantially equal magnitude, but opposite, in effect on the voltage state of the nets in the circuit.

18. The integrated electronic circuit of claim 17, wherein the circuit has at least two nets carrying the same signal or the signal and its inverse, where each of these nets have at least two contact areas for which a single event has an opposing effect on the voltage state of said two nets, comprising:
   a first contact area and a second contact area placed, each from a separate redundant net, for which a single event has the effect of changing the voltage state on the two redundant nets, wherein the first and second contact areas are non-adjoining, and a third contact area placed in between the first and second contact areas, said third contact area having an effect on the voltage state on at least one of the redundant nets, and wherein said effect of the third contact area is caused by a single event and opposes the effects of the first and second contact areas; and
   wherein the strength of the effect of a single event on the placed contact areas is selected such that any single event that affects the two redundant nets, at maximum can change the state of one of the nets, but never both nets.

19. The integrated electronic circuit of claim 17, wherein the circuit comprises MOSFET devices, further comprising:
   all MOSFET source (S) and drain (D) doping areas, which are not directly connected to the power-nets (VSS, VDD) are designated as the contact areas; and
   n-type MOSFET drains or sources, are designated as the contact areas for which a single event have the effect of pulling the voltage state, of the nets connected to this contact area, low, and the p-type MOSFET drains or sources, are designated as the contact areas for which a single event have the effect of pulling the voltage state, of the nets connected to this contact area, high.

20. The integrated electronic circuit of claim 19, further comprising:
   additional MOSFET devices located between two nets, which at any time, carry opposite voltage states, in such a way that if one of the nets is affected by a single event, such that its voltage state is changed, then the additional MOSFET device turns on, connecting the two nets, and hence ensures that the state of the second net is not changed; and
   the sources or drains of the p-type MOSFETs connected in the two nets by additional p-type MOSFETs with their gates connected to the high level power net VDD, and the sources or drains of the n-type MOSFETs are connected in the two nets by additional n-type MOSFETs with their gates connected to the low level power net VSS.

* * * * *